Sept. 15, 1931. A. O. AUSTIN Re. 18,189

MEANS FOR SUPPORTING BAFFLES IN OIL FILLED BUSHINGS

Original Filed Aug. 11, 1924 2 Sheets-Sheet 1

INVENTOR
Arthur O. Austin.
BY Alpheus J. Crane
ATTORNEY

Sept. 15, 1931. A. O. AUSTIN Re. 18,189

MEANS FOR SUPPORTING BAFFLES IN OIL FILLED BUSHINGS

Original Filed Aug. 11, 1924 2 Sheets-Sheet 2

INVENTOR
Arthur O. Austin.
BY Alpheus J. Crane
ATTORNEY

Reissued Sept. 15, 1931 Re. 18,189

UNITED STATES PATENT OFFICE

ARTHUR O. AUSTIN, OF NEAR BARBERTON, OHIO, ASSIGNOR, BY MESNE ASSIGNMENTS, TO THE OHIO BRASS COMPANY, OF MANSFIELD, OHIO, A CORPORATION OF NEW JERSEY

MEANS FOR SUPPORTING BAFFLES IN OIL-FILLED BUSHINGS

Original No. 1,726,096, dated August 27, 1929, Serial No. 731,503, filed August 11, 1924. Application for reissue filed June 13, 1931. Serial No. 544,248.

This invention relates to insulator bushings for high potential conductors and has for its object the provision of insulators of the class named which shall be of improved construction and operation and which shall have improved means for supporting parts within the bushing, and maintaining a tight joint between the parts.

The invention is exemplified in the combination and arrangement of parts shown in the accompanying drawings, and described in the following specification, and it is more particularly pointed out in the appending claims.

In one method of making high voltage bushings, the bushing consists essentially of two hollow members which are clamped together to form one outer shell. Inside of this shell are placed insulating baffles to prevent dielectric breakdown between the center conductor and the flange of the bushing. Bushings of this type are made for various purposes, such as transformers, oil circuit breakers and entrance bushings.

In order to provide the necessary electrical characteristics, it is necessary to provide a sufficient diameter so that the dielectric material will not be overworked. This necessitates large and difficult dielectric members unless the bushing is made in smaller pieces.

Figure 1:
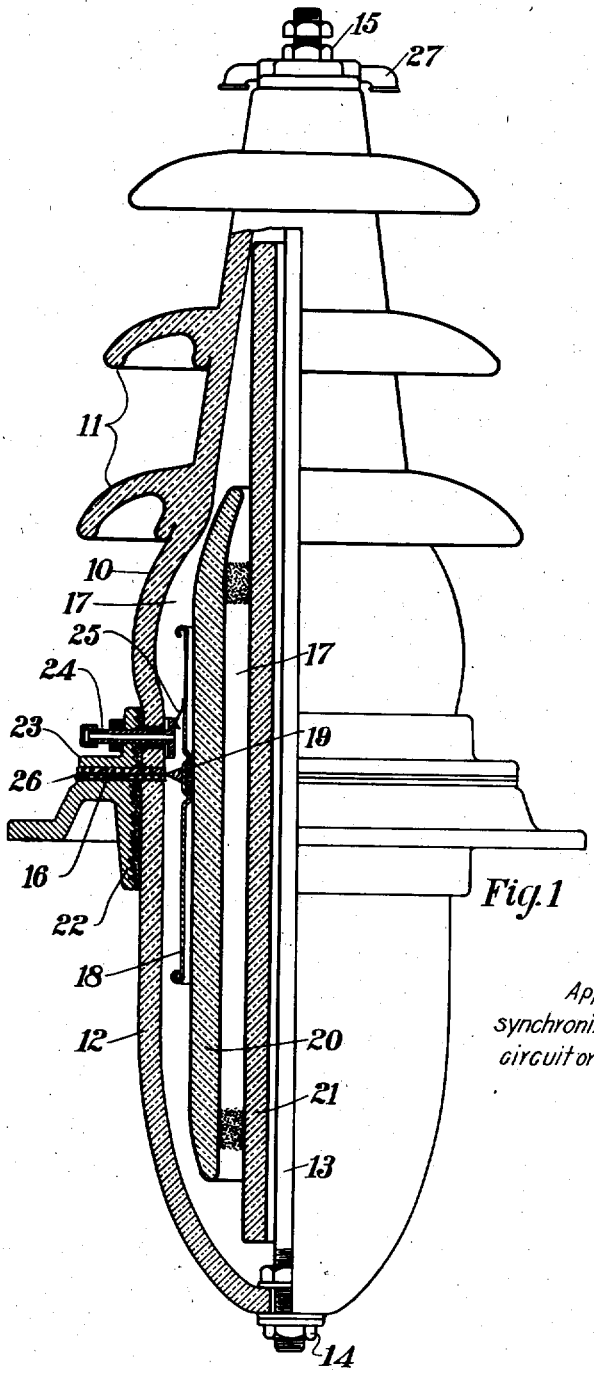
Fig. 1 is an elevation of an insulator bushing with parts in section showing one embodiment of the present invention.

In the construction shown in Fig. 1, all of the dielectric members are readily made and have the same effect as though the bushings were made up in a solid piece. In Fig. 1, the bushing consists essentially of a dielectric member 10 with water sheds or flanges 11 and a dielectric member 12, which are held together by a conductor rod 13 having clamping nuts 14 and 15, the gasket 16 forming a tight joint. Owing to the space 17 around the baffles being filed with oil or insulating compound, it is necessary to prevent this leaking out at the center. The gasket 16, which may be of cork or other suitable material, forms a tight joint when nut 15 is tightened up.

As the dielectric members 10 and 12 are adjacent to each other with only a gasket between, it is a comparatively easy matter to form a tight joint, even though the range of temperature may be considerable. This is due to the fact that both dielectric members will be at practically the same temperature and have the same linear coefficient and will expand and contract radially at the same rate. This avoids any tendency to set up stress or destroy the gasket by slipping as is likely to be the case where the dielectric member is clamped against a metal flange or sleeve having a different rate of expansion than the dielectric member.

This invention has to do with the means of supporting the core or internal screen 18. The electrostatic shield or screen 18 is provided with a radial flange or projections 19, being preferably tapered at the outer edge. This wedge shaped flange or projections is inserted in or placed between the layers of the gasket 16 so that when the two dielectric members are clamped into position, the gasket will hold the projecting flange 19 firmly in position so as to support the static shield 18 and the dielectric baffles 20 and 21 if they are attached to the shield. As the wedge shaped supporting section 19 is held in the gasket 16, there will be no electrical contact if the gasket is of an insulating material. In this case the charging current between the projecting flange 19 and the flange 22 or the flange 23 would cause destruction of the gasket and permit the bushing to leak unless provision is made to prevent this effect.

Electrical contact is to obviate this difficulty. Electrical contact is provided through the tubular member 24 which makes contact with a spring member 25 attached to the static shield 18. This tubular member 24 can also be used for regulating the height of the oil or compound in the bushing.

Figure 7:
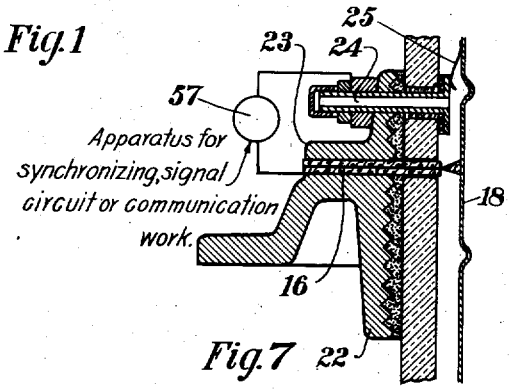
Fig. 7 is a view similar to Fig. 2 but showing a connection by which the invention may be used for providing an electrostatic coupling for synchronizing signal circuit or communication work.

Electrical contact may be made directly between the member 23 and the flange 22 by a jumper or lead or, where the insulating of the gasket is sufficient, electrostatic capacity between the screen 18 and the lead 13 may be used for electrostatic coupling for such as synchronizing or signal circuit or communication work. Connection to the screen 18 for this purpose may be made by connecting a suitable electrical translating device 57 in the circuit between the screen 18 and the flange 22, as shown in Fig. 7. Where it is not desired to use the electrostatic capacity, a small jumper strip 26 is placed over the gasket 16 as as to form contact between the upper and lower metallic flanges. Where the contact is maintained entirely between the center rod, the flange 23 may be omitted. If the gasket is conducting or is provided with a conducting layer or insert, the electrical contact will also be provided with the static screen 18 without the necessity of the tube 24. In this case the bushing is filled through the vents 27.

Figure 2:
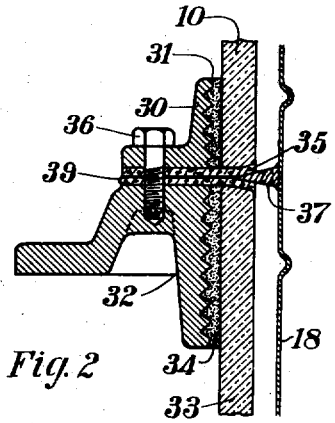
Fig. 2 is a fragmentary sectional view showing a somewhat modified form of the invention.

A somewhat different arrangement is shown in Fig. 2. In this case the flange 30 is attached to the dielectric member 10 by cement or suitable material 31 and the flange 32 is attached to its corresponding dielectric member 33 by cement or holding material 34. A gasket 35 is placed between the two dielectric members and a tight joint made by clamping up with the bolts 36. The wedge shaped projections or flange 37 is inserted, preferably in the center of the gasket. The adjacent edges of the dielectric members 10 and 23 are preferably tapered so as to conform to the holding member 37. A thin metallic member 39 is placed in electrical contact with the member 37 and extended out through the gasket or between the layers of the gasket and turned over the edge of the gasket so that they will be in metallic contact with flanges 32 and 30.

This arrangement will supply the necessary charging current to the electrostatic screen 18. The contact member 39 may be in the form of a ring which will act as a dam to prevent leakage through the gasket. This is particularly advisable where the joint between the metallic flanges and the dielectric is of an open structure to provide resiliency and the bushings are used under pressure, which is likely to force leakage through the joint. The construction has the advantage in that the bushing may be readily assembled or taken down, and, as there is no large mass of metal between the dielectric members, differential expansion or contraction will not set up a high stress.

Figure 3:
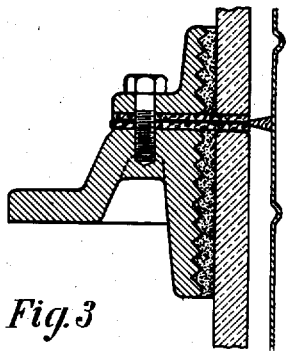
Fig. 3 is a view similar to Fig. 2 showing another modification.

In Fig. 3, a similar arrangement to that described in connection with Fig. 2 is shown with the exception that the dielectric members have square ends adjacent the holding member 37 rather than tapered. The projecting flange or member 37 may be split up into sections, and, when attached to a portion of the electrostatic shield, which is backed up, there will be sufficient resiliency so that there will be no tendency for the projecting member 37 to work in the joint and destroy the gasket.

Figure 4:
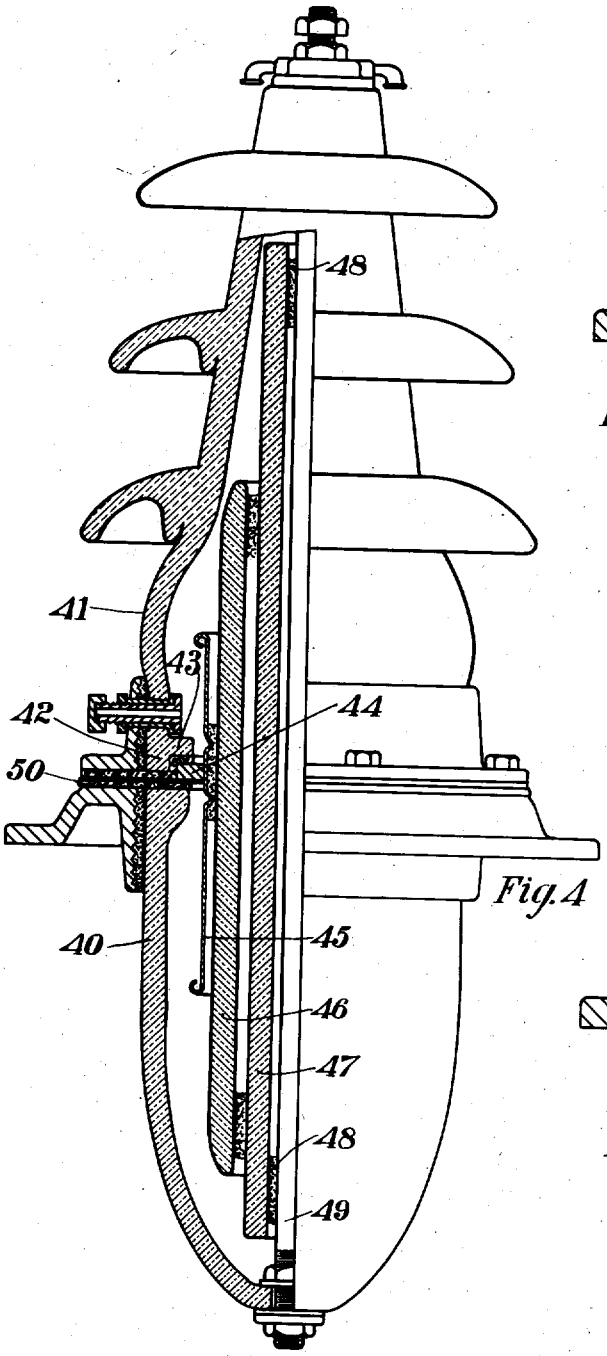
Fig. 4 is a view similar to Fig. 1 showing still another form of the invention.
Figure 5:
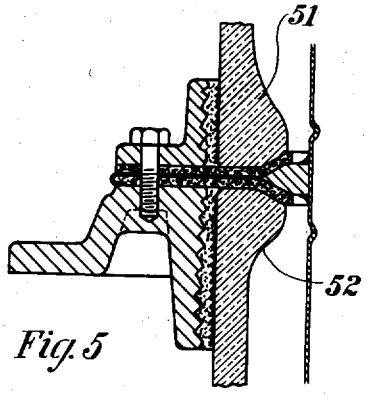
Figs. 5 and 6 are views similar to Figs. 2 and 3 showing other modifications.
Figure 6:
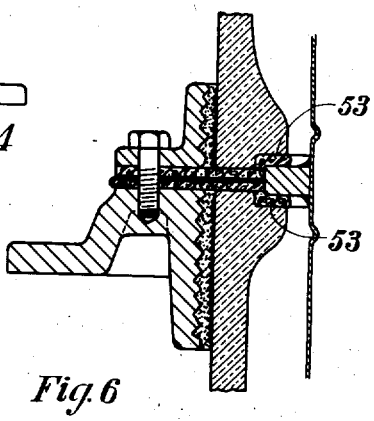

It is evident that the desired results may be obtained by changing the relative proportions or the minor details, some of these being shown in Figs. 4, 5 and 6.

In Fig. 4, the lower dielectric member 40 has a flat bearing surface which is easily ground on a surface table or by other means. The upper dielectric member 41 also has a flat bearing ring 42 which may be readily surfaced. The projecting ring 43 need not be turned up as a gasket or other cushioning material may be used to hold the projection 44 which is secured to the electrostatic screen 45 and holds the screen and the baffles 46 and 47. A cushioning material 48 may be used between the sleeves or baffles 47 and the conductor 49 so that there will be no danger of the baffle striking the outer dielectric shells due to excessive vibration or in clamping the two parts of the shell together. This construction has the advantage in that all parts may be turned up easily and baffles and electrostatic screen may be placed in position before clamping up. Electrical contact may be made by the conducting dam or strip 50 as in the previous figures.

Another method of providing a good width of bearing for the gasket is shown in Fig. 5. The dielectric members have thickened sections 51 and 52 which may be added either inside or outside the normal wall.

In Fig. 6, the construction is similar to that in Fig. 4 except that a recessed portion 53 is provided in each dielectric member. It is evident that this thinner section may be either inside or outside the normal wall. In case the projection is on the outside it may be used as a shoulder for the metallic flanges to rest upon in clamping up.

I claim:

1. An insulator comprising a pair of complementary dielectric shells having registering parts, means for clamping said shells together to form a closed casing, a gasket interposed between said registering parts and a supporting device clamped by said registering parts in contact with said gasket, said device having its outermost portion within the outer periphery of said registering parts.

2. An insulator comprising a pair of complementary dielectric shells having registering parts, means for clamping said shells together to form a closed casing, a pair of gaskets interposed between said registering parts and a supporting device having a portion disposed between said gaskets and held thereby for supporting parts within said casing, said device being entirely within the outer periphery of said registering parts.

3. An insulator comprising a pair of complementary dielectric shells, means for clamping said shells together to form a closed casing and a device having a relatively thin flange extending between said shells when clamped together and held thereby for supporting parts within said casing, said flange having its outer edge disposed within the outer periphery of the adjacent portions of said shells.

4. An insulator bushing comprising a pair of complementary shells, means for clamping said shells together to form a closed casing and a circular support arranged within said casing and having a relatively thin flange extending between said shells and clamped thereby, the outer diameter of said flange being less than the outer diameter of said shells adjacent said flange.

5. An insulator bushing comprising a pair of complementary dielectric shells arranged to register with one another, means for clamping said shells together to form a closed casing, a baffle disposed within said casing, a supporting ring for said baffle having a relatively thin flange extending between said shells and clamped thereby, the outer diameter of said flange being less than the outer diameter of said shells adjacent said flange.

6. An insulator comprising a pair of complementary members, means for clamping said members together and a support having a tapered flange with its thin edge extending between said members and clamped thereby and its thicker edge projecting from between said members.

7. An insulator comprising a pair of complementary dielectric shells, means for clamping said shells together to form a closed casing and a support having a tapered flange having its thinner edge extending between said shells and clamped thereby.

8. An insulator comprising a pair of complementary shells of dielectric material, means for clamping said shells together to form a closed casing, a gasket interposed between the registering portions of said shells and a supporting member having a tapered flange engaging said gasket and clamped against said gasket between the registering portions of said shells.

9. An insulator bushing comprising a pair of shells having the edges thereof arranged to register with each other, a gasket interposed between said edges, means for clamping said edges against said gasket to form a tight joint between said shells and a supporting flange extending into the joint between the said edges for a portion only of the thickness of said shells where they register with one another.

10. An insulator bushing comprising a pair of shells having the edges thereof arranged to register with one another, means for clamping said edges together to form a tight joint, the inner portions of said edges being offset to provide clearance therebetween and a supporting flange disposed in said offset portion.

11. An insulator bushing comprising a pair of dielectric shells having the edges thereof arranged in registration with each other, a gasket interposed between said registering edges, means for clamping said shells to each other to form a closed casing and a supporting ring disposed within said casing, said ring having the outer circumference thereof extending into the joint between said registering edges for a portion only of the width of said joint.

12. An insulator bushing comprising a pair of dielectric shells having registering edges, means for clamping said shells to each other to form a tight joint between said edges, a gasket disposed between said edges, a baffle within said bushing and a supporting flange secured to said baffle, the registering edges of said shells having the inner portions thereof recessed to provide clearance into which the outer portion of said supporting flange projects.

13. An insulator comprising a pair of complementary dielectric shells having registering edges, a pair of gaskets interposed between said edges, a baffle arranged within said bushing and a supporting flange for said baffle extending between said gaskets for a portion only of the width of said registering edges.

14. An insulator bushing comprising a pair of complementary dielectric shells, forming a closed casing, a flux screen arranged within said casing and having a supporting flange extending radially therefrom between adjacent portions of said shells and means for clamping said shells together to form a tight joint and to secure said supporting flange in position, the outer diameter of said flange being less than the outer diameter of the registering parts of said casing.

15. An insulator bushing comprising a pair of complementary dielectric shells having registering edges, a cylindrical flux screen disposed within said bushing and having a flange thereon extending outwardly between the shells, a dielectric baffle secured to the inner portion of said flux screen, a gasket interposed between said shells and extending therebetween beyond the outer edge of said flange and means for clamping said shells together to form a tight joint and to support said flange.

16. An insulator bushing comprising a pair of complementary dielectric shells having registering edges, metallic flanges secured to the outer surfaces of said shells adjacent to said registering edges, a baffle within said bushing, a flux screen within said bushing, said baffle and screen being secured to one another, a flange for supporting said baffle and screen extending between said registering edges for a portion of the thickness only thereof, means for clamping said shells together to form a closed casing and an electrical connection between said flux screen and said outer flanges.

17. An insulator bushing comprising a pair of complementary dielectric shells having opposed edges, metallic flanges secured to the outer surfaces of said shells adjacent said edges, a flux screen within said bushing, an electrical connection between said flux screen and said flanges, and means for connecting an electrical translating device in said electrical connection.

18. The combination with a bushing insulator of a conductor extending through said insulator, a capacitance member disposed within said insulator and insulated from said conductor and providing electrostatic coupling with said conductor and means for connecting said capacitance member with synchronizing apparatus to energize said apparatus from said conductor.

19. The combination with a bushing insulator of a conductor extending through said insulator, a support of conducting material for said bushing insulator, a capacitance member disposed within said insulator and insulated from said conductor and from said support, and an electrical translating device disposed outside of said insulator and electrically connected between said capacitance member and said support.

20. Means for synchronizing high potential alternating current electric circuits comprising an insulator, a conductor insulated by said insulator and adapted to form connection with one of said high potential circuits and a low potential member of conducting material insulated from said conductor by said insulator and adapted for connection with synchronizing apparatus, said conductor and low potential member constituting a condenser forming an electrostatic coupling with said high potential circuit.

21. Means for forming electrostatic coupling with a high potential alternating current circuit comprising a high potential conductor adapted for connection with said circuit, a bushing insulator through which said conductor extends, a capacitance member of conducting material insulated from said conductor by said bushing insulator, and means for connecting an electrical translating device with said capacitance member for energizing said translating device, said capacitance member and conductor forming a condenser and providing capacitance coupling between said conductor and translating device.

22. Means for forming electrostatic coupling with a high potential alternating current circuit comprising a high potential conductor adapted for connection with said circuit, a bushing insulator through which said conductor extends, a capacitance member of conducting material disposed within said insulator and insulated from said conductor by said insulator, and means for connecting an electrical translating device with said capacitance member for energizing said translating device, said capacitance member and conductor forming a condenser and providing capacitance coupling between said conductor and translating device.

In testimony whereof, I have signed my name to this specification this 10th day of August, A. D. 1931.

ARTHUR O. AUSTIN.